3,294,543
METHOD FOR SUPPLYING PHOSPHORUS AND OTHER DIETARY SUPPLEMENTS TO ANIMALS
Joe C. Eller, Houston, Tex., assignor to Dawson Chemical Company, Inc., Houston, Tex., a corporation of Texas
No Drawing. Filed Nov. 26, 1962, Ser. No. 240,133
4 Claims. (Cl. 99—2)

My present invention relates to a method for supplying palatable and assimilable phosphorus to animals, particularly domestic livestock, and it also renders possible the convenient introduction thereto of other dietary supplements.

It has long been recognized that livestock need supplemental phosphorus in many areas of the country because the soil does not supply sufficient amounts of this mineral through pasturage to meet the minimum requirements therefor. Although it is relatively simple to supply supplemental phosphorus to dairy cattle and other animals which are fed daily, there has been no completely satisfactory technique for insuring that range animals which are fed infrequently receive the necessary amounts.

In recent years it has become common practice to utilize the drinking water of range animals as a medium for satisfying their phosphorus requirements. A phosphorus bearing mineral such as disodium phosphate or monosodium phosphate is suspended in an aqueous solution which is introduced into the watering system for the animals through any of a number of types of liquid dispensers. However, this method of supplying phosphorus is subject to some relatively major objections. First, the phosphorus-containing materials tend to crystallize out of solution upon slight lowering of the temperature such as normally occurs at night or during the winter season. This produces variations in the strength of the solution and results in inaccurate control of the rate of supply to the animals. In addition, suspension of the phosphorus-containing material in a aqueous solution for dispensing is somewhat inconvenient, as the relatively large amounts of fluid which are required to supply a proper amount of phosphorus demand a dispenser with a large reservoir. Without a large volume reservoir the necessity for frequent refilling would become both troublesome and expensive. The problems of liquid dispensing are multiplied by the substantial labor required to mix the disodium phosphate or monosodium phosphate with water, for these minerals normally are supplied in a dry form to reduce shipping costs.

Another popular method of supplying phosphorus to range livestock is through the dry feeding of bone meal. However, this approach has proven unsatisfactory because many animals do not like the taste of bone meal and will fail to avail themselves of this supply. Further, the use of bone meal in dry form is uneconomical because substantial amounts are lost through the untidy eating habits of many types of animals. Finally, wind and rain are likely to waste substantial amounts of bone meal or impair its taste or texture to such an extent that animals cannot or will not eat it.

My invention is directed to the use of a phosphorus-containing material which can be introduced into the watering system for the animals in a dry form, preferably from a dry dispenser. Even though a dispenser is not employed, convenience demands that the material be stored at or near the watering tank or trough, and this condition along with several others related to the peculiar needs of the situation form the basis for the following list of essential or highly desirable characteristics thereof:

(1) It must be water soluble.
(2) It must be non-hygroscopic.
(3) It must be high in phosphorus content.
(4) It must be palatable to the livestock.
(5) It must be non-toxic to livestock.
(6) It must be in such form that it can be assimilated within the body system of the livestock for effective use.
(7) It must not cause precipitation of the phosphorus or other minerals upon introduction to the drinking water.
(8) It must cause no substantial change in the pH of the drinking water solution within the range of concentration adequate to supply phosphorus in the needed quantities.
(9) It should be low in inert carriers.
(10) It should be relatively pure, and certainly defluorinated.
(11) It should be capable of flowing freely through dispensing apparatus.
(12) It should be resistant to caking or bridging in dispensing apparatus over substantial periods of time.
(13) It should be economical.

The problem of finding a material which meets all of the above requirements is quite difficult. For example, as pointed out, the material must be hydrophilic, but most hydrophilic materials are hygroscopic. A conditioner could be added to make the phosphorus-containing material non-hygroscopic, but such conditioners ordinarily are hydrophobic, and their use would be undesirable because upon addition of the material to the drinking water, the phosphorus-containing material would go into solution whereas the conditioner would be immiscible with water. Continued use of a material containing such conditioner would be impractical because of the increasing concentration thereof in the water over a period of time.

I have found that one material meets all of the above specified requirements. This material is sodium triphosphate, an anhydrous white crystalline material also known as sodium tripolyphosphate and STPP. It has an empirical formula of $Na_5P_3O_{10}$, and may exist as a powder or granule. Phosphorus content is about 25% and the pH of a 1% water solution is 9.7. The influence of sodium triphosphate on the pH of drinking water in the range of concern is insignificant.

Sodium triphosphate is shown to be soluble to the extent of about twelve parts in one hundred parts saturated solution at 15° C. which is quite satisfactorily soluble in the desired concentration range for the purpose under discussion. My experience has indicated that range cattle normally would require no more than 0.3% STPP by weight, which is well below the limit of 12%.

Sodium triphosphate in a powdered or granulated form fully meets the requirements for dry dispensing into drinking water. It is readily soluble in water, but non-hygroscopic. Thus, it can be stored for relatively long periods of time without losing its ability to flow freely. Although it can be introduced into a water tank by hand at proper intervals, it is particularly suited for use in dry dispensing apparatus in which it will not cake or bridge within the hopper or reservoir. It is unnecessary to add a conditioner to render it non-hygroscopic so there is no problem of a progressively increasing concentration of a conditioning material in the drinking water.

Apparatus which will introduce the sodium triphosphate into the drinking water is readily available. As the material can be stored within the hopper of such apparatus in a dry form, substantial amounts can be provided in a relatively small space to permit only occasional refilling. From the dispensing apparatus, the material can be introduced continuously or intermittently, and the introduction can be rendered automatic in any of several ways, as by timing means, float means controlled by the liquid level within the drinking tank or otherwise as convenient. The type of dispenser forms no part of my invention and the details of appropriate apparatus are not disclosed herein.

The unique characteristics of STPP render it ideally suitable for service as a vehicle to introduce other additives into the drinking water. The salts of a number of metals which may be needed in animal diets such as manganese, copper, iron, cobalt and zinc are hygroscopic, and thus would be unsuited for dry dispensing. The elaborate precautions necessary to prevent exposure to atmospheric moisture would make such dispensing impractical. Further, such elements are needed by animals only in very small quantities, and dispensing apparatus suitable for introducing these salts in vary small amounts with accuracy is not available to my knowledge. However, when dispersed through sodium tripolyphosphate in the required amounts, these metallic salts will form a very small part of the total bulk of the dry additive material, and their affinity for moisture will present no problem, for no troublesome lumping or caking can occur.

My research has indicated that other dietary and/or therapeutic supplements may be added to STPP for introduction into the drinking water. For example, vitamin A is available in a stable and water soluble form, and when mixed in small amounts with STPP, it can be readily dispensed therewith. Similarly, antibiotics such as aureomycin and certain systemic insecticides, all of which are hygroscopic, can be mixed with the phosphorus bearing material for introduction into the diet of the animals. All of these materials would be impractical to add to drinking water alone, and the use of sodium tripolyphosphate as a carrier therefor opens an entirely new field of dietary supplementation for animals.

It becomes apparent that the combination of characteristics which is most significant in the use of STPP for dispensing into drinking water is its lack of affinity for atmospheric moisture coupled with its solubility in water. Of course, STPP is somewhat less soluble than disodium phosphate or monosodium phosphate, but it is sufficiently soluble to pass into solution within a few hours after introduction. My experience has indicated that there is no appreciable build-up of crystals within the drinking tank over a period of time, but the rate of solubility may be increased by introducing the mineral through a dispenser which adds water thereto at the time of or immediately prior to introduction into the tank. Devices of this type are commercially available.

Based upon the amount of phosphorus present in sodium triphosphate, I have determined that such material should be added to the drinking water for cattle in the range of from one to three ounces, dry weight, for each eight gallons of water in the drinking tank, or for each animal for each day. The proper amount will depend not only on the amount of phosphorus which may be obtained by the animals in question from the pasture in which they normally feed and similar factors, but also on the condition of the animals themselves. For example, dry cows on pasture under normal rainfall conditions probably would require the minimum amount of one ounce per day. For weaned calves, yearlings, heifers and mature bred cows during the winter season, the amounts might be increased to one and one-half ounces. For cows which are nursing, bulls, fattened yearlings and two year olds, and all cattle on pasture during low rainfall periods, the maximum amount of three ounces might be recommended. It is to be understood that these figures relate to cattle, and the requirements of other animals can readily be determined based on the factors mentioned above.

I claim as my invention:

1. In a method of feeding palatable and assimilable phosphorus to animals, the process comprising the steps of charging a watering tank dispenser with a supply consisting essentially of substantially dry sodium triphosphate, releasing said sodium triphosphate into a watering tank at a rate to create an effective concentration thereof of up to twelve parts of sodium triphosphate for each 100 parts of water and thereafter supplying the resulting solution to animals as drinking water.

2. In a method of feeding phosphorus and other dietary supplements to animals, the process comprising the steps of charging a watering tank dispenser with a substantially dry mixture consistiing essentially of sodium triphosphate as the major constituent thereof, and hygroscopic dietary and therapeutic supplements as minor constituents thereof, releasing said sodium triphosphate mixture into a watering tank at a rate to establish an effective concentration thereof of up to twelve parts of sodium triphosphate for each 100 parts of water, and thereafter supplying the resulting solution to animals as drinking water.

3. In a method of feeding palatable and assimilable phosphorus to animals, the process comprising the steps of charging a watering tank dispenser with a supply consisting essentially of substantially dry sodium triphosphate, releasing said sodium triphosphate into a watering tank at a rate of up to three ounces for each eight gallons of water added thereto to form an effective concentration of sodium triphosphate in the water and supplying the resulting solution to animals as drinking water.

4. In a method of feeding phosphorus and other dietary supplements to animals, the process comprising the steps of charging a watering tank dispenser with a substantially dry mixture consisting essentially of sodium triphosphate as a major constituent thereof and hygroscopic dietary and therapeutic supplement as relatively minor constituents thereof, releasing said sodium triphosphate mixture into a watering tank at a rate of up to three ounces of sodium triphosphate for each eight gallons of water added thereto to form an effective solution of sodium triphosphate and supplying the resulting solution to animals as drinking water.

References Cited by the Examiner

UNITED STATES PATENTS 2,760,866    8/1956    Nielsen.
3,011,891    12/1961   Locuratolo.
3,124,459    3/1964    Erwin.

OTHER REFERENCES

Merck Index, 7th ed., 1960, page 965.
Morrison: Feeds and Feeding, 22nd ed., 1957, Morrison Pub Co., Ithaca, N.Y., pages 101–102.

A. LOUIS MONACELL, *Primary Examiner.*

D. J. DONOVAN, *Assistant Examiner.*